INFORMATION STORAGE DEVICES

Filed April 5, 1963 3 Sheets-Sheet 1

Inventors
M. W. GRIBBLE
R. NAYLOR
By
Cameron, Kerkam & Sutton
Attorneys

Inventors
M. W. GRIBBLE
R. NAYLOR
By
Cameron, Kerkam & Sutton
Attorneys

March 30, 1965 M. W. GRIBBLE ETAL 3,176,275

INFORMATION STORAGE DEVICES

Filed April 5, 1963 3 Sheets-Sheet 3

Inventors
M. W. GRIBBLE
R. NAYLOR
By
Cameron, Kerkam + Sutton
Attorneys

United States Patent Office 3,176,275

Patented Mar. 30, 1965

3,176,275

INFORMATION STORAGE DEVICES

Maurice Woolmer Gribble, Romiley, Stockport, and Ronald Naylor, Cheadle Hulme, Cheadle, England, assignors to Ferranti, Limited, Lancashire, England, a company of Great Britain and Northern Ireland Filed Apr. 5, 1963, Ser. No. 270,978

Claims priority, application Great Britain, Apr. 7, 1962, 13,487/62

11 Claims. (Cl. 340—173)

Figures 1, 2:
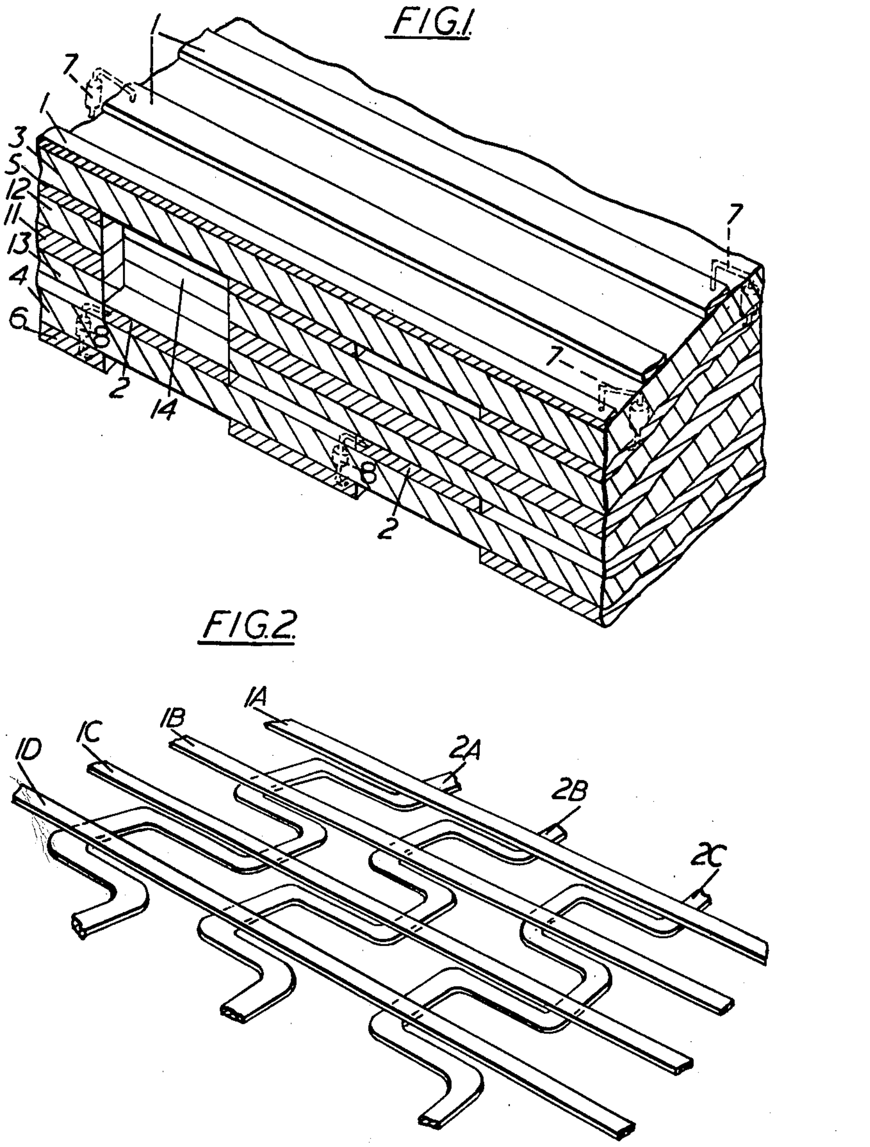

This invention relates to information storage devices.

In electronic computers it is frequently necessary to store information in a permanent or semi-permanent form, such information being, for example, tables of values or programmes concerned with the computer input and output, or library sub-routines. It is important that such information should not be destroyed by a failure of the power supply or inadvertently by the programmer and it is an advantage if the device has a fast access time.

It is an object of the present invention to provide a storage device in which information is stored in a semi-permanent form and which has a fast access time.

According to the present invention an information storage device comprises first and second sets of transmission lines, each transmission line of said second set crossing each transmission line of said first set to define a plurality of storage locations at each of which one transmission line of said first set may be electrically coupled to one transmission line of said second set, each transmission line of said first and second sets being terminated at one end with a resistance having a value equal to the characteristic impedance of said transmission line, and a sheet of electrically conductive material adapted to be inserted between said first and second sets of transmission lines, said sheet of electrically conductive material having holes at positions corresponding to the required storage locations to permit electrical coupling between the two transmission lines defining each required storage location and to prevent electrical coupling between the two transmission lines defining each remaining storage location.

Also in accordance with the present invention an information storage device comprises first and second sets of spaced electrical conductors mounted respectively in first and second parallel planes, each conductor of said second set crossing each conductor of said first set and having at each cross-over a portion of its length parallel to the conductor of said first set, said cross-overs defining a plurality of storage locations each uniquely defined by a conductor of said first set and a conductor of said second set, first and second earth planes comprising first and second sheets of electrically conductive material disposed adjacent to said first and second sets of conductors respectively to form therewith first and second sets of transmission lines, each transmission line so formed being terminated at one end with a resistance having a value equal to the characteristic impedance of said transmission line, each of said earth planes having an aperture at each said storage location, and a further sheet of electrically conductive material adapted to be inserted between said first and second sets of transmission lines, information being stored in said device by the presence or absence of holes in said further sheet of electrically conductive material at positions corresponding to the required storage locations.

The conductors of said first and second sets of conductors may be spaced such that the cross-overs defining the storage locations occur at positions corresponding to standard positions on a standard punched card.

Figure 3:
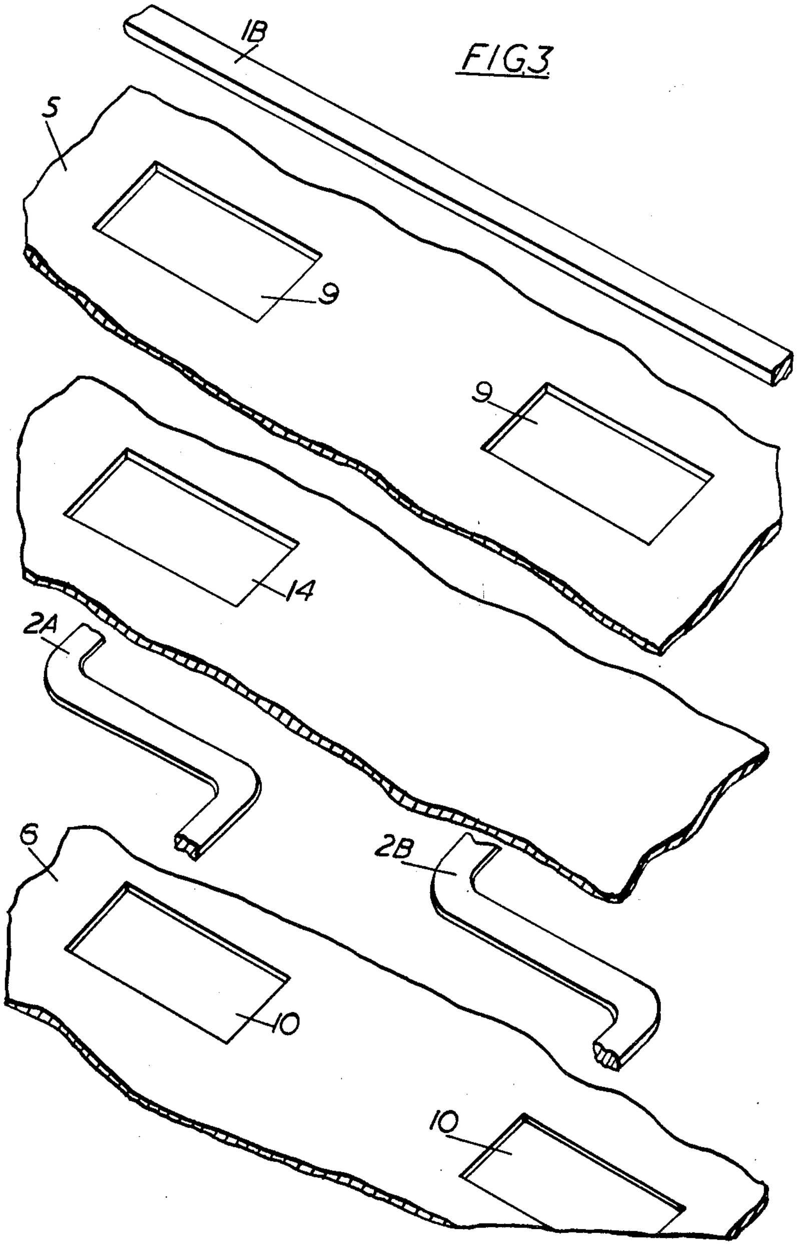
Figure 4:
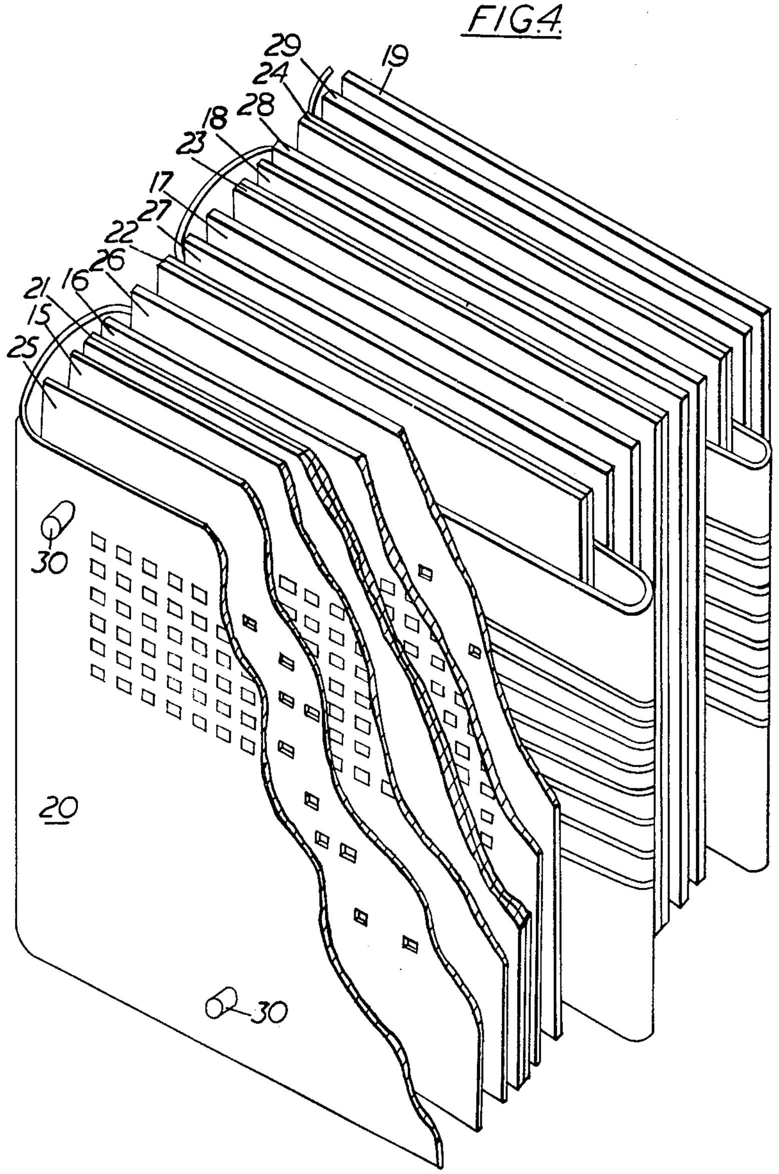

The present invention will now be described by way of example with reference to the accompanying drawings in which:

FIGURE 1 is a sectional perspective view of part of an information storage device in accordance with the invention, FIGURE 2 is a perspective view of the two sets of conductors of the device shown in FIGURE 1, FIGURE 3 is an exploded perspective view of two storage locations of the device shown in FIGURE 1, and FIGURE 4 is a perspective view of an assembly of information storage devices of the kind shown in FIGURE 1.

Referring now to FIGURES 1, 2 and 3 of the drawings, the information storage device shown includes first and second sets of copper conductors 1 and 2 printed on sheets 3 and 4 respectively of electrically non-conductive material, the sheets 3 and 4 being mounted parallel to each other. The first set of conductors 1 comprises straight parallel spaced conductors as may be seen from FIGURE 2 which shows four conductors 1A, 1B, 1C and 1D from the first set of conductors and three conductors 2A, 2B and 2C from the second set of conductors. From FIGURE 2 it will be seen that the second set of conductors comprises spaced conductors each of which crosses each of the conductors of the first set 1 and each having at each crossover a portion of its length parallel to the conductor of the first set of conductors 1. The cross-overs between the conductors of the first set 1 and the conductors of the second set 2 define a plurality of storage locations each uniquely defined by a conductor of the first set and a conductor of the second set. Thus FIGURE 2 shows twelve storage locations each of which is uniquely defined by one of the conductors 1A, 1B, 1C, 1D and one of the conductors 2A, 2B, 2C.

Two copper earth planes 5 and 6 are printed on the sheets 3 and 4 respectively on the side opposite to that on which the sets of conductors 1 or 2 are printed. The earth plane 5 together with the set of conductors 1 forms one set of transmission lines, each transmission line so formed being terminated at one end by a resistance having a value equal to the characteristic impedance of the line, the terminations being at opposite ends for adjacent lines. The terminating resistances of the first set of lines are indicated by the resistors 7 in broken line in FIGURE 1. Similarly, the earth plane 6 together with the set of conductors 2 forms a second set of transmission lines, each transmission line so formed again being terminated at one end by a resistance having a value equal to the characteristic impedance of the line, the terminations being at the same ends for all of the lines in the second set. The terminating resistances of the second set of lines are indicated by the resistors 8 in broken line in FIGURE 1. It is emphasized that the resistors 7 and 8 form line terminations and are not connected in the positions at which they are indicated. The earth planes 5 and 6 are provided with apertures 9 and 10 respectively at each storage location, as is shown more clearly in FIGURE 3 which shows an exploded view of the two storage locations defined by the conductor 1B and the conductors 2A and 2B.

A further sheet 11 of copper, coated on both sides with layers 12 and 13 of an insulating varnish, is inserted between the two sets of transmission lines and information is stored in the device by means of holes such as 14, FIGURES 1 and 3, punched in the sheet 11 at the required storage locations.

In operation, to detect information stored in the storage device current pulses are applied sequentially to the second set of transmission lines at the ends remote from the terminating impedances. At each storage location where there is no hole punched in the copper sheet 11, the transmission line in the second set is screened from the transmision line in the first set and there is little or no coupling between the two. At each storage location where there is a hole punched, however, there is impedance coupling, which is a combination of inductive and capacitive coupling, between the transmission lines of the first and second sets and an output is therefore induced in the transmission line of the first set. Due to the changes in direction of the conductors of the second set with respect to the conductors of the first set the outputs induced in adjacent transmission lines in the first set are in opposite directions and it is for this reason that adjacent transmission lines of the first set are terminated at opposite ends as previously stated, the outputs being taken from the non-terminated ends. The terminating resistors 7 and 8 dissipate the energy in the transmission lines and prevent reflections along the lines.

If a large number of storage locations are desired the area required by a storage device of the kind described above may become excessive. FIGURE 4, however, shows a storage assembly in which a large number of storage locations may be contained within a reasonable space.

Referring now to FIGURE 4, the storage device shown includes a plurality of sheets of electrically non-conductive material such as 15, 16, 17, 18 and 19 having sets of parallel spaced copper conductors (not visible) printed on one side and earth planes printed on the other side and a further flexible sheet 20 having a set of copper conductors printed on one side and an earth plane printed on the other side. The sheets 15–19 are stacked together and the sheet 20 interleaved between them in such manner as to form a plurality of storage sections each similar to the device described above with reference to FIGURES 1 to 3, each storage section so formed being screened from adjacent sections by means of screens such as 21, 22, 23, 24 formed by a layer of copper contained between two sheets of insulating material. The transmission lines formed by the conductors and earth planes on the sheets 15–20 are terminated by resistances having a value equal to the characteristic impedance of the lines in a manner similar to that described above with reference to FIGURES 1 to 3. The conductors on the sheet 20 are common to each section of the storage device and each storage location is therefore defined by the crossover of a conductor on the sheet 20 and a conductor on one of the sheets such as 15–19. The earth planes on each of the sheets 15–20 are provided with an aperture at each storage location. Further sheets of copper such as 25, 26, 27, 28 and 29 are provided for each section of the storage device and information is stored in the device by means of holes punched in the sheets such as 25–29 at the required storage locations. All of the sheets are clamped together and located by means of dowels 30.

Information is read out of the storage device in a similar manner to that described above with reference to FIGURES 1 to 3, current pulses being applied sequentially to the transmission lines on the sheet 20, the outputs from corresponding rows in each section of the store being delivered in parallel.

In a storage device of the kind described with reference to FIGURE 4 it is convenient to space the conductors such that the storage locations occur at positions corresponding to standard positions on a standard punched card. The information storage sheets such as 25–29 may then be made equal in size to a standard punched card and the standard punch equipment used to punch the holes in the information storage sheets at the required locations. Each such information storage sheet is able to store twelve rows of seventy-five binary digits and each section of the store may be designed to accommodate two such storage sheets side by side to give a storage of 1800 binary digits per section.

The storage devices described above may be modified in many ways. For example, the layers 12 and 13 of insulating varnish may be applied to the earth plane 5 and the conductors 2 instead of the storage sheet 11. Alternatively they may be replaced by separate sheets of insulating material. It is not necessary to provide holes in the sheets of insulating material at the storage locations. Also, the position of the conductors 2 and the earth plane 6 may be reversed so that the earth plane 6 is adjacent the storage sheet 11. This results in better shielding between the two sets of transmission lines but slightly decreases the coupling between them. This, however, is compensated to some extent in that it is no longer necesasry to provide sheets of insulation between the earth planes and the storage sheet. Furthermore, although the conductors and earth planes have been described as being printed the conductors may be formed from copper strip or wire and the earth planes from copper sheet, and the conductors may pass across the apertures in the earth planes and storage sheets diagonally instead of parallel to one side as shown. The second set of transmission lines may be terminated at opposite ends for adjacent lines instead of at the same end as described above or alternatively the transmission lines of both sets may be terminated by characteristic impedances at both ends.

Storage devices of the kind described above have a fast access and cycle time, the latter, in fact, being limited only by the speed of response of the associated equipment such as electronic amplifiers. Also, the information stored is semi-permanent in that it is not affected by such faults as power supply failures, but the information stored may readily be changed by an operator.

What we claim is:

1. An information storage device comprising first and second sets of transmission lines, each set of which comprises first and second sets of spaced electrical conductors mounted respectively in first and second parallel planes, each transmission line of said second set crossing each transmission line of said first set to define a plurality of storage locations at each of which one transmission line of said first set may be electrically coupled to one transmission line of said second set, each transmission line of said first and second sets being terminated at one end with a resistance having a value equal to the characteristic impedance of said transmission line, and a sheet of electrically conductive material adapted to be inserted between said first and second sets of transmission lines, said sheet of electrically conductive material having holes at positions corresponding to the required storage locations to permit electrical coupling between the two transmission lines defining each required storage location and to prevent electrical coupling between the two transmission lines defining each remaining storage location.

2. An information storage device comprising first and second sets of spaced electrical conductors mounted respectively in first and second parallel planes, each conductor of said second set crossing each conductor of said first set and having at each cross-over a portion of its length parallel to the conductor of said first set, said cross-overs defining a plurality of storage locations each uniquely defined by a conductor of said first set and a conductor of said second set, first and second earth planes comprising first and second sheets of electrically conductive material disposed adjacent to said first and second sets of conductors respectively to form therewith first and second sets of transmission lines, each transmission line so formed being terminated at one end with a resistance having a value equal to the characteristic impedance of said transmission line, each of said earth planes having an aperture at each said storage location, and a further sheet of electrically conductive material adapted to be inserted between said first and second sets of transmission lines, information being stored in said device by the presence or absence of holes in said further sheet of electrically conductive material at positions corresponding to the required storage locations.

3. An information device as claimed in claim 2 in which the conductors of said first and second sets of transmission lines are spaced such that the cross-overs defining the storage locations occur at positions corresponding to standard positions on a standard punched card.

4. An information storage assembly comprising a stack of storage sections, each section comprising first and second sets of transmission lines, each set of which comprises first and second sets of spaced electrical conductors mounted respectively in first and second parallel planes, each transmission line of said second set crossing each transmission line of said first set to define a plurality of storage locations at each of which one transmission line of said first set may be electrically coupled to one transmission line of said second set, each transmission line of said first and said second sets being terminated at one end with a resistance having a value equal to the characteristic impedance of said transmission line, and a sheet of electrically conductive material between said first and second sets of transmission lines, said sheet of electrically conductive material having holes at positions corresponding to the required storage locations to permit electrical coupling between the two transmission lines defining each required storage location and to prevent electric coupling beween the two transmission lines defining each remaining storage location.

5. An information storage device comprising first and second sets of transmission lines, each set of which comprises first and second sets of spaced electrical conductors mounted respectively in first and second parallel planes, each transmission line of said second set crossing each transmission line of said first set to define a plurality of storage locations at each of which one transmission line of said first set may be impedance coupled to one transmission line of said second set, each transmission line of said first and second sets being terminated at one end with a resistance having a value equal to the characteristic impedance of said transmission line, and a sheet of electrically conductive material between said first and second sets of transmission lines, said sheet of electrically conductive material having holes at positions corresponding to the required storage locations to permit impedance coupling between the two transmission lines defining each required storage location and to prevent impedance coupling between the two transmission lines defining each remaining storage location.

6. An information storage device as set forth in claim 5 wherein said impedance coupling is a combination of inductive and capacitive coupling.

7. An information storage device comprising a first set of spaced electrical conductors, a second set of spaced electrical conductors, said first and second sets of spaced electrical conductors being mounted respectively in first and second spaced parallel planes, each conductor of said second set having a portion of its length arranged substantially perpendicular to and crossing each conductor of said first set, each conductor of said second set having at each cross-over a portion of its length parallel to the crossed-over conductor of said first set, said cross-overs defining a plurality of storage locations each defined by a conductor of said first set and a conductor of said second set, first and second earth planes comprising first and second sheets of electrical conductive material disposed adjacent to said first and second sets of conductors, respectively, to form therewith first and second sets of transmission lines, each transmission line so formed being terminated at one end with a resistance having a value equal to the characteristic impedance of said transmission line, each of said earth planes having an aperture at each storage location, and a further sheet of electrically conductive material between said first and second sets of transmission lines, said further sheet of electrically conductive material having holes at positions corresponding to the required storage locations to permit impedance coupling between the two transmission lines defining each required storage location and to prevent impedance coupling between the two transmission lines defining each remaining storage location, whereby information may be stored in said device by the presence or absence of holes in said further sheet of electrically conductive material at positions corresponding to the required storage locations.

8. An information storage device comprising first and second sets of transmission lines, said first and second sets of transmission lines each comprising a sheet of electrically non-conductive material having a set of conductors mounted on one side and an earth plane mounted on the other side, each transmission line of said second set crossing each transmission line of said first set to define a plurality of said storage locations at each of which one transmission line of said first set may be electrically coupled to one transmission line of said second set, each transmission line of said first and second set being terminated at one end with a resistance having a value equal to the characteristic impedance of said transmission line, and a sheet of electrically conductive material adapted to be inserted between said first and second sets of transmission lines, said sheet of said electrically conductive material having holes at positions corresponding to the required storage locations to permit electrical coupling between the two transmission lines defining each required storage location and to prevent electrical coupling between the two transmission lines defining each remaining storage location.

9. An information storage device comprising first and second sets of transmission lines, said first and second sets of transmission lines each comprising a sheet of electrically non-conductive material having a set of conductors mounted on one side and an earth plane mounted on the other side, said conductors and said earth planes being printed on said sheet of electrically non-conductive material, each transmission line of said second set crossing each transmission line of said first set to define a plurality of storage locations at each of which one transmission line of said first set may be electrically coupled to one transmission line of said second set, each transmission line of said first and second sets being terminated at one end with a resistance having a value equal to the characteristic impedance of said transmission line, and a sheet of electrically conductive material adapted to be inserted between said first and second sets of transmission lines, said sheet of electrically conductive material having holes at positions corresponding to the required storage locations to permit electrical coupling between the two transmission lines defining each required storage location and to prevent electrical coupling between the two transmission lines defining each remaining storage location.

10. An information storage assembly comprising a stack of storage sections, each section comprising first and second sets of transmission lines, said first and second sets of transmission lines having first and second sets of spaced electrical conductors mounted respectively in first and second parallel planes, each transmission line of said second set crossing each transmission line of said first set to define a plurality of storage locations at each of which one transmission line of said first set may be electrically coupled to one transmission line of said second set, each transmission line of said first set being terminated at one end with a resistance having a value equal to the characteristic impedance of said transmission line, each transmission line of said second set of transmission lines in each of said storage sections being electrically connected in series to form a set of transmission lines common to all of said storage sections, each transmission line of said common set of transmission lines being terminated at one end by a resistance having a value equal to the characteristic impedance of said transmission line and a sheet of electrically conductive material between said first and second sets of transmission lines, said sheet of electrically conductive material having holes at positions corresponding to the required storage locations to permit electrical coupling between the two transmission lines defining each required storage location and to prevent electrical coupling between the two transmission lines defining each remaining storage location.

11. An information storage assembly comprising a stack of storage sections, each section comprising first and second sets of transmission lines, said first and second sets of transmission lines having first and second sets of spaced electrical conductors mounted respectively in first and second parallel planes, each transmission line of said second set crossing each transmission line of said first set to define a plurality of said storage locations at each of which one transmission line of said first set may be electrically coupled to one transmission line of said second set, corresponding transmission lines of said second set of transmission lines in each of said storage sections being electrically connected in series to form a set of transmission lines common to all of said storage sections, each transmission line of said common set of transmission lines being terminated at one end by a resistance having a value equal to the characteristic impedance of said transmission line, said common set of transmission lines being formed on a flexible sheet of electrically non-conductive material, each transmission line of said first set being terminated at one end with a resistance having a value equal to a characteristic impedance of said transmission line, and a sheet of electrically conductive material between said first and second sets of transmission lines, said sheet of electrically conductive material having holes at positions corresponding to the required storage locations to permit electrical coupling between the two transmission lines defining each required storage location and to prevent electrical coupling between the two transmission lines defining each remaining storage location.

References Cited by the Examiner

UNITED STATES PATENTS

| | | | |
|---|---|---|---|
| 2,900,624 | 8/59 | Stuart-Williams | 340—174 |
| 2,978,683 | 4/61 | Alexander | 340—174 |
| 3,084,336 | 4/63 | Clemons | 340—174 |
| 3,102,999 | 9/63 | Bernemyr | 340—174 |

OTHER REFERENCES

IBM Technical Disclosure Bulletin, Bruce et al., High Speed Reader; vol. 4, No. 1, June 1961, page 4.

IRVING L. SRAGOW, *Primary Examiner.*